United States Patent [19]

Jones, Sr.

[11] Patent Number: 4,860,911
[45] Date of Patent: Aug. 29, 1989

[54] CARGO CONTAINER

[76] Inventor: John L. Jones, Sr., P.O. Box 233, Pasadena, Calif. 91102

[21] Appl. No.: 732,303

[22] Filed: May 9, 1985

Related U.S. Application Data

[63] Continuation of Ser. No. 649,522, Sep. 11, 1984, Pat. No. 4,836,411.

[51] Int. Cl.$^4$ .............................................. B65D 87/00
[52] U.S. Cl. ...................................... 220/1.5; 206/335
[58] Field of Search ............... 206/335, 814, 593, 523; 220/334, 1.5, 71; 105/378, 159

[56] References Cited

U.S. PATENT DOCUMENTS

| | | | |
|---|---|---|---|
| 2,907,147 | 9/1975 | Goobeck | 220/1.5 |
| 3,498,480 | 3/1970 | Gutridge | 206/335 X |
| 3,515,303 | 6/1970 | Robertson et al. | 220/1.5 X |
| 3,684,122 | 8/1972 | Bonomi | 220/1.5 |
| 3,724,394 | 4/1973 | Pringle | 105/378 X |
| 4,318,349 | 3/1982 | Galasan | 105/378 |
| 4,339,039 | 7/1982 | Mykleby | 206/523 |

Primary Examiner—Steven M. Pollard
Attorney, Agent, or Firm—J. L. Jones

[57] ABSTRACT

A further modification of the invention of U.S. Ser. No. 06/649,522 below discloses a closed multi purpose product container suitable for heavy duty transportation of commodity products by railroad flat cars, freight ships and land motor truck powered trailers. The modification of a full top opening has two intersecting hinged flat rigid top lids and can have side flaps extending the container length. Each one-half flat hinged lid can open and hinge from one of the opposed two long flat rigid side walls. A pair of an opposed front end wall and a hinged rear end wall door can have end wall load reinforcement designed to prevent the container end walls from bowing and deforming in shape during the acceleration and deceleration of the loaded cargo container, during the starting and stopping of a loaded train having the product containers disposed on the flat cars of the train. The hinged top flat dual rigid lids and the hinged rear flat dual rigid doors of the container in combination enable the use of the same container for multi-purpose types of product loads. The CLC container can be loaded with granular or lump product commodities. When the cleaned CLC is used as a rear door loading container, multiple automobiles can be disposed inside, and secured to prevent the automobiles rolling. The automobiles can have pressure sensitive adhesively bonded elastomeric strips protectively disposed across the cars front and rear bumpers, as the autombiles are disposed on a horizontal ramp secured in the CLC container. The ramps can be disposed at least two high in the CLC container. If the automobiles are each 13 feet long, three automobiles can be secured on each ramp in a 40 foot long container for a total of at least six automobiles per CLC container.

3 Claims, 2 Drawing Sheets

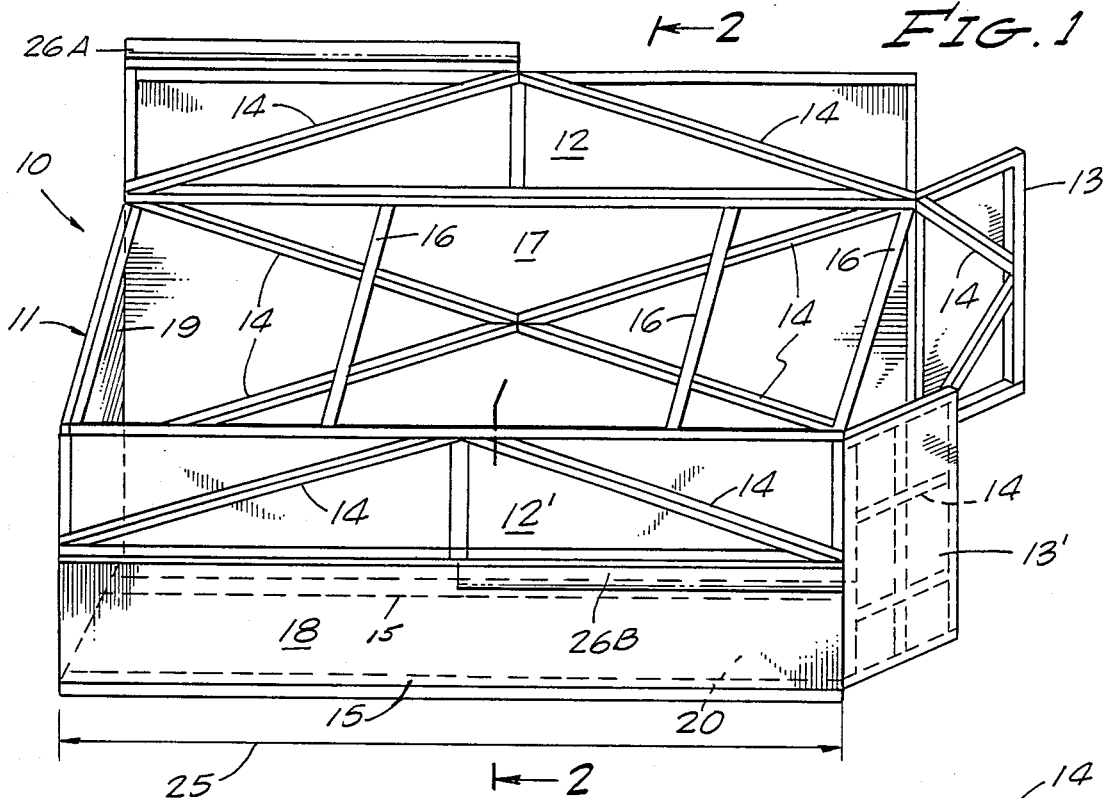
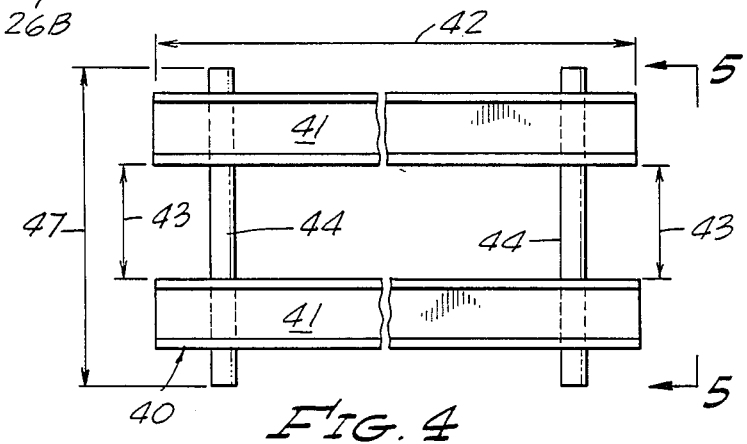
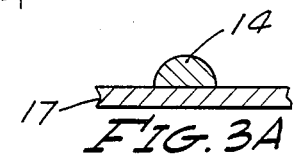
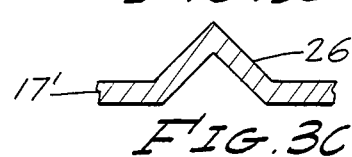
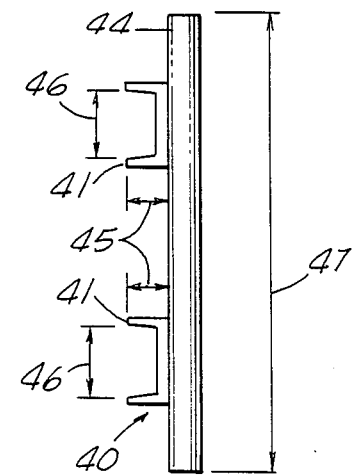

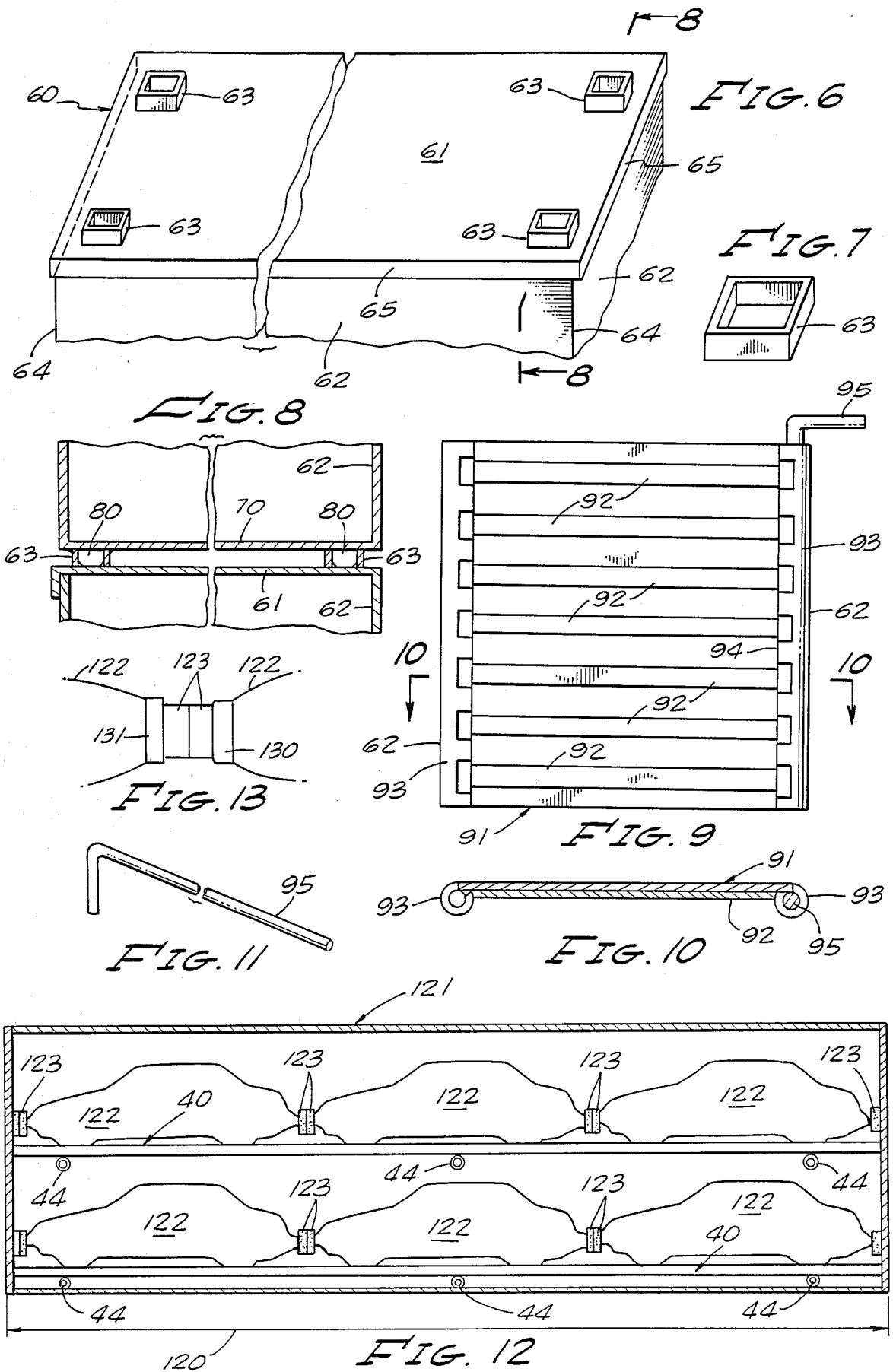

CARGO CONTAINER

CROSS REFERENCE TO RELATED APPLICATION

This subject U.S. patent application is a continuation of a U.S. patent application by the same inventor, filed on Sept. 11, 1984 as Ser. No. 06/649,522 and titled MULTI-PURPOSE HEAVY DUTY CARGO CONTAINER.

BACKGROUND OF THE INVENTION

The rectangular transportation container (CLC) of this invention is classified in Classes 220/1.5, 4, 5, 7 and 217/43, 65.

In U.S. Pat. No. 2,126,950 issued on Aug. 16, 1938 to F. Ditchfield, there is disclosed and claimed a transportation means having a metallic body with side and end walls, a hinged means for closing a door in one of said walls, and automatic locking means carried by the transportation means adjacent the lower margin of the door. The locking means has a plurality of spaced locking dogs.

In U.S. Pat. No. 3,128,897 issued Apr. 14, 1964 to W. B. Wilkins, there is disclosed and claimed a cargo container of lengths up to 40 feet and capacity up to 30 tons or more. The containers are low cost, non-metallic materials. The container wall is a plurality of superimposed laminar of fiber glass sheets bonded by a polyester resin adhesive. A front end and a rear opening door provide metal or non-metal frames on which a tubular wall is formed.

In U.S. Pat. No. 3,481,503 issued Dec. 2, 1969, Kloess and Quade disclose and claim an open top freight container having a detachable top cover. A watertight stiff top cover is provided with cam operated secure locking devices which insures the tight fit of the detachable top cover alignment on the container.

Sherwood discloses and claims in U.S. Pat. No. 3,460,174 issued Nov. 25, 1969, a foundation frame upon which a plurality of freight containers can be mounted in indexed relation thereto, and transported as a single unit.

In U.S. Pat. No. 3,972,437 issued Aug. 3, 1976 Lovide, Meller and Morse disclose and claim top four corners hoist brackets on a cubical container for lifting and maneuvering the container.

Funaioli, Rossetti and Landini in U.S. Pat. No. 4,177,907, issued Dec. 11, 1979 teach and claim a collapsible, folding cargo container having a base wall with an upright base section of a wall. A corresponding extension section of each wall is provided.

SUMMARY OF THE INVENTION

A further modification of the invention of U.S. Ser.No. 06/649,522 discloses a closed multi-purpose product container suitable for heavy duty transportation of commodity products by railroad flat cars, freight ships and land motor truck powered trailers. The modification of a full top opening of two intersecting hinged flat rigid top lids can have side flaps and extend the container length, each one-half flat hinged lid opening and hinged from one of the opposed two long flat rigid side walls. A pair of an opposed front end wall and a hinged rear end wall door can have end wall load reinforcement preventing the container end walls from bowing and deforming in shape during the acceleration and deceleration of the loaded cargo container, during the starting and stopping of a loaded train having the product containers disposed on the flat cars of the train. The closed dual hinged flat rigid lid transportation container (CLC) has structural welded seams securing two long flat rigid walls, a bottom flat rigid wall, and a front end flat rigid wall, and can have a reinforced pair of dual rear end hinged doors so as to carry high density lump loads, such as lump coal, powdered and granular chemicals, food grains and other solid loads. The closed dual hinged flat rigid lid transportation metal container has structural strength reinforcement provided by metal truss members welded to the container walls, inside or outside the walls. The multiple truss members can have triangular and half round cross section, and be welded to the CLC container inside walls. When product is dumped from the CLC container through the open top lid, no granular product can be lodged behind a truss member. The multiple truss members can stiffen the CLC container, so the hinged dual top lids can be unlatched and opened, and the loaded CLC container can be lifted by a crane, turned over and the product load dumped out of the container into a product pile. No granular product will be retained inside the container behind trusses. Equivalently substituting for welded traingular strength reinforcement trusses, multiple V-shaped strength stiffening pleat means and half round trusses may be substituted and formed in and on the side walls, top lids, rear doors and bottom of the CLC. The v-shaped stiffening pleat means in the metal panels can be formed in the panels while the heated panels are forged in a hydraulic press. The V-shaped pleat means can be disposed in the panels in both vertical and horizontal directions with respect to the completely assembled CLC, providing maximum panel strength stiffening, equivalent in strength to the welded triangular trusses, as is needed.

The hinged top flat dual rigid lids and the hinged rear flat dual rigid doors of the container in combination enable the use of the same container for multi-purpose types of product loads. When the CLC container is loaded with granular or lump product commodities, such as coal, pure sand, or food grains, or the like granular materials, the hinged top flat rigid lids with side flaps, of the container and the hinged rear flat rigid doors can be sealed by gaskets which prevent the product from leaking out and contaminating the surroundings. When the cleaned CLC is used as a rear door loading container, multiple automobiles can be disposed inside, and secured to prevent the automobiles rolling. The automobiles can have pressure sensitive adhesively bonded elastomeric strips protectively disposed across the front and rear bumpers, as the automobiles are disposed on a horizontal ramp secured in the container. The ramps can be disposed at least two high in the container. If the automobiles are each 13 feet long, three automobiles can be secured on each ramp in a 40 foot long container for a total of six automobiles per CLC container. Six automobiles or the like commodities can be securely held in a CLC without shipping damage,the automobiles disposed and secured in the ramps through the hinged lid or rear door. The protected cars can be stacked on a container freight ship, and shipped to its destination, protected from the ocean air and spray.

Neoprene or other flexible chemically impermeable, deformation resistant rubber or plastic strips can be sized and quickly adaptively closely fitted on the automobiles front and rear bumpers, as the automobiles are loaded in the containers.

A series of CLC containers can be quickly top loaded at a coal mine, the top lids closed, and the containers stacked. The CLC containers can then be loaded on a train of flat cars, transported to a ship freight dock, and indexed above on other container lids, and quickly loaded on a container freighter, all without spilling coal on the right-of-way and docks. On reaching the destination for the coal, the separately loaded containers are picked up by a crane, the open hinged lid CLC containers are turned over, and the coal dumped into a storage pile.

The CLC containers are then washed and sent to a return freight depot for loading automobiles in the CLC containers, and securing the automobiles from movement in the CLC containers. The sealed loaded containers are protected from sea air and spray during the return ocean voyage.

The CLC containers can typically be 10,20,40 ft. long, and 8 ft. wide by 8 ft. to 10 ft. high. Other CLC overall dimensional values can be utilized to accommodate other national transportation container standards. The walls of the CLC containers can range rom 3/16 to ¾ inch thick, with truss reinforcement for the walls. The CLC containers can carry loads typically up to 100 tons ormore. If truss reinforcement is applied inside the CLC container, a triangular or half-round cross section truss member can be utilized so as to eliminate depository ledges inside the CLC for the granular products being transported. The CLC container can typically be copper alloyed steel, aluminum alloys, nickel or other metal stock, or plastic reinforced fiberglass, as is required.

Included in the objects of this invention are:

To provide a closed product container (CLC) suitable for product transportation by railroad flat car, freight ship, and land motor truck powered trailers.

To provide a dual hinged full flat rigid top opening lid, as well as a rear flat rigid opening door, in combination in a product container (CLC).

To provide a dual hinged top flat rigid lid which opens quickly on a product container, providing for quick loading and unloading of a product container (CLC) with lump and granular products.

To provide a transportation container (CLC) with gasketed top flat dual rigid lid and rear door closures, which can minimize carried product contamination.

To provide a closed product container with adaptively sized automobile ramp securing attachments, providing for the quick loading and transportation of multiple automobile in a single CLC on ramps.

Other objects and advantages of this invention are taught in the following description and claims.

BRIEF DESCRIPTION OF THE DRAWINGS

The description of this invention is to be read in conjunction with the following drawings:

FIG. 1 is an isometric projective view of a product container (CLC) suitable for product transportation, having a full top opening of two intersecting hinged flat rigid lids and a reinforced rear opening flat rigid door.

FIG. 2 is a partial sectional view through 2—2 of FIG. 1, illustrating interior and exterior reinforcement truss members as a welded part of the product container (CLC) dual rigid lid combination.

FIG. 3A is a fragmentary sectional view through 3—3 of FIG. 1 having a solid half round truss member welded to a panel member of the CLC. FIG. 3B is an alternate sectional triangular strength stiffening panel means. FIG. 3C is another alternate V-shaped panel strength stiffening means.

FIG. 4 is a plan view of an automobile supporting ramp. FIG. 5 is an end view of the automobile supporting ramp through 5—5 of FIG. 4.

FIG. 6 is an isometric projective top partial view of a CLC container having a first full top opening one-piece hinged lid with side flaps, and four channel indexing means disposed and secured on the first lid for indexing a second container to be secured on the first lid.

FIG. 7 is a more detailed isometric projection of the indexing means illustrated in FIG. 6.

FIG. 8 is a cross sectional view of a pair of partially illustrated CLC containers stacked one on the other, further illustrating the completed indexing means of FIG. 7.

FIG. 9 is a frontal exterior view of a hinged end wall door which is reinforced to provide the stress loading reinforcement of an end wall panel for a fixed end wall front end of a CLC or the opening rear flat rigid door of a CLC container.

FIG. 10 is a cross section through FIG. 9, illustrating the reinforcement of an end panel shown in FIG. 9.

FIG. 11 is a staff fastening means for the rear door shown in FIG. 9.

FIG. 12 is a cross sectional view of a CLC container illustrating the horizontal automobile supporting ramps of FIG. 4 secured in the CLC container, and holding six automobiles.

FIG. 13 is a cross sectional view of the self-adhesive bonded elastomeric spacers secured on the front and rear bumpers of the automobiles of FIG. 12, providing securing means for the automobiles in FIG. 12.

DESCRIPTION OF THE PREFERRED EMBODIMENT OF THE INVENTION

Referring to FIG. 1, the open multi-purpose product container (CLC) 10 suitalbe for heavy duty transportation of commodity products by railroad flat cars, freight ships and land motor truck powered trailers, has a reinforces rectangular box 11 and a full top opening of two intersecting hinged flat rigid lids 12 and 12', as well as conventional rear opeing flat rigid reinforced doors 13 and 13', and a long, axial length 25. The CLC 10 can have structurally reinforcement traingular and half-round solid metal trusses 14 secured and disposed on the two long side walls 17 and 18, and on the forward end wall 19, all 14 trusses disposed and secured by welding or by riveting. The container (CLC) 10 also can have the two intersecting top hinged flat rigid lids 12 and 12' stiffened by welded trusses 14, or the like, as well as the rear opening doors 13 and 13', secured and stiffened by the welded trusses 14. The triangular or half-round cross-section trusses 14 can be secured to the flat rigid panel walls 12, 12', 13, 13', 17, 18, 19, and bottom flat rigid wall 20, as be welding or other conventional securing and stiffening means. The bottom flat rigid wall 20 also has the multiple stiffening and supporting beams 15 secured and disposed on the interior of bottom 20.

A 60° triangular or round cross section truss 16 is positioned and securely welded or otherwise fastened at the terminal ends of flat rigid wall panels 17 and 18 adjacent to doors 13 and 13' and along the length 25, at the top edges of panesl 17 and 18, providing wall positions and wall structural stability to the flat rigid wall panels 17 and 18. The triangular cross section truss 16 has its cross section corner rotationally positioned adjacent the load in the CLC 10, providing no flat surface in CLC 10 which can hold and retain a granular or powdered load in CLC 10 on dumping CLC 10 from the two lid tops 12 and 12'.

In FIG. 2 the cross sectional partial view through 2—2 of FIG. 1 illustrates the open product container (CLC) 10 having a flat rigid side wall 18 and another flat rigid side wall 17. The welded triangular trusses or half-round trusses 14 (see FIGS. 3A, 3B, 3C), are shown on internal faces of the walls 17 and 18, supporting, strengthening and securing the walls, when container (CLC) 10 is loaded with product. As an alternate substitution for welded triangular strength reinforcement trusses and half-round trusses, multiple V-shaped strength stiffening pleat means 26 may be substituted and formed in the side walls, 17, 18, 19, top half lids 12 and 12', half rear doors 13 and 13', and bottom 20 of the CLC. (See FIG. 3C). The V-shaped stiffening pleat means 26 in the metal panels can be formed in the panels while the heated panels are pressed in a hydraulic press. The V-shaped pleat means 26 can be disposed in the panels in both vertical and horizontal directions with respect to the completely assembled CLC, providing maximum panel strength stiffening, equivalent in strength to the welded triangular trusses.

The plural hinges 22 are also shown in cross section, the plural hinges 22 securing the wall 17 to the half lid 12, permitting the half lid 12 to rotate in the arc 23 and shut the half lid 12 on the container (CLC) 10. The lid 12' is also to be rotated as at arc 24 and be hinged and secured to wall 18 by the hinge 22. The rod locking means 26 for lids 12 and 12' has two interlocking hasp pair components 26A and 26B, which are secured and locked together by a rod 26C, on closing the lids 12 and 12'. The plural hinges 22 have two flexible hinge components 22A and 22B each welded or riveted permanently onto the lids 12 and 12' and the and the wall panels 17, 18 and rotatingly secured together by the rotating rod 22C. The length of hinges 22 and the number of hinges 22 can be that required by usage of the lids 12 and 12'. The number and length of the rotating rod 22C can be the desired value.

FIG. 4 illustrates in plan view an automobile supporting ramp 40, having a pair of wheel support channels 41, whose lengths 42 are selected to fit inside lengthwise in a container 10 having an overall length 25. The support channels 41 are disposed a selected distancer 43 apart, providing support for the wheels of an automobile driven onto the supporting ramp 40. The pair of channels 41 are permanently secured on and spaced apart on the plurality of hollow pipe cross members 44. The number of hollow pipe cross members 44 are those required to safely support the weight of the automobile disposed on ramp 40.

As shown in FIG. 5, the support channel pair 41 are adaptively sized in inside heights 45 and inside widths 46 required to contain the tires and wheels of an automobile disposed thereon pair 41. The securing hollow pipe member 44 is utilized as in Ser. No. 06/649,522, and is supported by restraining bar 205, and indexed in position in a container 10 by the restraining pin means 207. The length 47 of pipe member 44 and restraining bar 205 are adaptively sized to provide the safe carriage of an automobile without th automobile scraping against the interior of container 10. The restraining bars 205 are supported by the apertures 206 in the side walls 218 and 219, as disclosed in Ser. No. 06/649,522.

FIG. 6 illustrates in an isometric perspective top partial view a CLC container 60 having a full top opening one-piece hinged lid 61 with protective side flaps 65 around the box 62. Four indexing means 63 are provided and adaptively secured on the four corners of the lid 61. The indexing means 63 are positioned to bear on the four wall corners 64 of box 62 which act as pressure bearing columns. The typical indexing means 63 can be a cast steel shallow rectangular receptacle, which can be welded or otherwise adaptively secured over the corner 64, on the lid 61.

FIG. 7 is a perspective view of the detail of indexing means 63, showing the interior receptacle contour of means 63. FIG. 8 illustrates the operation of indexing means 63 in conjunction with the bottom wall panel 70 having indexing post means 80. The panel 70 has properly indexed post means 80 which is sized and adaptively positioned to fit into the receptacle of means 63.

Referring to FIG. 9 there is illustrated the plan view of a reinforced rear end panel hinged door 91 of container 60 or the like. The door 91 has been reinfornced with half-round, triangular steel cross section, or pressed pleats 92 of the type illustrated in FIG. 3, providing stress loading steel reinforcement to door 91, when the door is stressed in acceleration or deceleration of container 60 loaded with a loose granular load of coal, grain or the like. The door 91 has a hinged structure 93 which enables the door 91 to be fully opened. A mating hasp structure 94 formed by the door 91 and the side wall 65 are secured in indexing position by indexing pin 95 shown in FIG. 11. FIG. 10 illustrates in cross section view through 10—10 of FIG. 9, the reinforcement of door 91 interiorly by the steel reinforcement of FIG. 3.

FIG. 12 illustrates a cross section view through the length 120 of container 121 in which two automobile supporting ramps 40 of FIG. 4 are shown disposed and adaptively secured in the container 121, each ramp 40 secured by a plurality of hollow pipe cross members 44 as are required to support the three automobiles 122 disposed on each ramp 40. The three automobiles 122 are each protected from each other and the container 121 by pressure sensitive bonded elastomeric strips 123 protectively disposed andsecured across the automobiles front and rear bumpers. If the automobiles are each 13 feet long, three automobiles each can be secured on one ramp 40 in a container 121 which is 40 ft. long. At least two ramps 40 can be horizontally/disposed, one above the other, in a container for a total of six automobiles 122. FIG. 13 illustrates the detail of ELastomeric adhesively bonded strips bonded to the front bumper 130 and rear bumper 131 of automobiles 122.

The cross section area of a CLC contaienr 10 can also be 8 ft. wide by 10–11 ft. high, and also 40 ft. long. The present generation of automobiles are in the range of 55–60 in. high, and two layers of automobiles, as shown in FIG. 12, can fit in an 11 ft. high CLC container. Thus, an 11 ft. high CLC×8 ft. wide×40 ft. long has a volume of 3520 cu. ft. A coal load density of 60 lb/cu ft. in the above 3520 cu. ft. CLC represents a coal tonnage of 211,200 lb. or 105.6 tons in the CLC container. Since a standard coal car in the United States can contain 100 tons of coal, the CLC container 10 of the dimensions 8 ft. wide by 11 ft. high by 40 ft. long can accommodate the full coal load shipment of a standard 100 ton size coal car, as well as six small automobile on a return trip, as illustrated in FIG. 12 and the accompanying text.

The two sets of hinges 22 as illustrated in FIG. 2, can be heavy duty type piano hinges, secured along and joining the lid 12' to the side 18, and joining lid 12 to the side 17. The hinge 22 can have the ability to rotate through 270° arcs 24 and 23, as in closing the lid 12' on container 10, and in closing the lid 12 on container 10. The rod 26C can then lock the hasp portions 26A and 26B by insertion of rod 26C into the aligned registered apertures of 26A and 26B, sealing the lids 12 and 12' together.

A series of CLC containers can be quickly top loaded at a coal mine, the top lids closed, and the containers stacked. The CLC containers can the be loaded on a train of flat cars, transported to a ship freight dock, and quickly loaded on a container freighter, all without spilling coal on the right-of-way and docks. On reaching the destination for the coal, the loaded containers are picked up by a crane, the open hinged lid CLC containers are turned over, and the coal dumped into a storage pile.

The CLC containers are then washed and sent to a return freight depot, for loading multiple automobiles in the CLC containers, and securing the automobiles from movement in the CLC containers. Additional rack carrying provisions can be made for overhead loading of other smaller item freight in the automobile loaded CLC containers. The selaed, loaded containers are protected from sea air and spray during the return voyage.

The CLC containers 10 can typically be 10, 20, 40 ft. long, and 8 ft. wide by 8 to 10 ft. or more high. Other CLC overall dimensional values can be utilized to accommodate other national transportation container standards. The wall sof the CLC containers can range from 3/16 to ¾ inch thick, or thereabouts, with wall steel truss reinforcement. The CLC containers can carry loads typically up to 100 tons or more. If truss reinforcement is applied inside the CLC container, a half-round and a triangular cross section truss member can be utilized so as to eliminate depository ledges inside the CLC for the granular products being transported. The CLC container can typically be steel, aluminum, or other metal stock, or plastic reinforced fiberglass, as is required.

Many modifications in the rectangular transportation product container can be made in the light of my teachings. It is understood that within the scope of the claims, the invention can be practiced otherwise than as described.

I claim:
1. In a heavy duty product transportation container having a rectangular box having an axial length of from 10 to 40 feet, having a box width of from 7 to 12 feet, and a box depth of from 7 to 12 feet, said rectangular box having two long opposed flat rigid panel sides, a fixed flat rigid front end, a full rear flat rigid door, equivalently equal in area to said front end, and a flat rigid box bottom, said box area components disposed and integrally secured at the area perimeters, forming a commerical box structure, the combination comprising:
   dual full length flat rigid top hinged half lids lid and said a flat rigid box bottom having bottom structural trusses disposed interiorly on said bottom and permanently secured thereto said bottom length,
   each said full length flat rigid top hinged lid having at least one hinge securing said lid to an adjacent said long panel side, and at least one locking hasp pair means securing said dual lids to each other,
   at least two horizontal automobile supporting ramps are secured parallel inside the horizontal length of said rectangular box, each supporting ramp adaptively secured in a spaced position in said box necessary for supporting at least one automobile on each said ramp, each one of said horizontal ramps supported by a plurality of hollow pipe cross members and by a plurality of restraining bars secured and positioned in a plurality of apertures in said box by restraining pins disposed in said restraining bars.

2. In a heavy duty product transportation container having a rectangular box having an axial length, having a box width, and a box depth, said rectangular box having two long opposed flat rigid panel sides, a fixed flat rigid front end, a full rear flat rigid door, equivalently equal in area to said front end, and a flat rigid box bottom, aforesaid listed rectangular box structural components having area dimensions equivalent to present heavy duty commerical cargo box container, said box area components disposed and integrally secured at the area perimeters, forming a commercial box structure, the combination comprising:
   dual full length flat rigid top hinged lids said flat rigid box bottom having bottom structural trusses disposed interiorly on said bottom and permanently secured thereto said bottom length,
   each said full length flat rigid top hinged lid having at least one hinge securing said lid to an adjacent said long panel side, and at least one locking hasp pair means securing said dual lids to each other,
   at least two horizontal automobile supporting ramps are secured parallel inside the horizontal length of said rectangular box, each supporting ramp adaptively secured in a spaced position in said box necessary for supporting at least one automobile on each said ramp, each one orf said horizontal ramps supported by a plurality of hollow pipe cross members and by a plurality of restraining bars secured in each said cross members, said restraining bars secured and positioned in a plurality of apertures in said box by restraining pins disposed in said restraining bars, and,
   elastomeric strips, having pressure sensitive adhesive film disposed on one face of said elastomeric strips, are disposed on and adhesively secured on the exteriors of front bumpers and rear bumpers of an automobile disposed and secured on said horizontal automobile supporting ramps.

3. A process providing at least a dual product transportation journey in a rectagular box having an axial length, a box width and a box depth, said rectangular box having two long opposed flat rigid panel sides, a fixed flat rigid reinforced front end, full flat rigid reinforced rear door, equivalently equal in area to said front end, two opening intersecting full length flat rigid top hinged lids, and a flat rigid box bottom having botton structural trusses disposed along the full bottom length and secured thereto, said box having at least one tension reinforcement truss means securing said two long panel sides together overhead and adjacent said flat rigid reinforced rear door, and at least two dual sets of horizontal automobile supporting ramps are secured parallel inside the horizontal length of said rectangular box, each dual set of supporting ramps adaptively secured ina space deposition in said box necessary for supporting at least one automobile on each dual set of said ramps, each one of said horizontal ramps supported by a plurality of hollow pipe cross members and by a plurality of restraining bars secured in each said cross members, said restraining bars secured and positioned in a plurality of apertures in said box by restraining pins disposed in said restraining bars, said process comprising:

loading at one geographical location aforesaid box with a multiplicity of automobiles, transporting the loaded box to a second geographical location, unloading aforesaid box at said second location, removing said automobile supporting ramps and the plurality of hollow pipe cross members from aforesaid box, covering aforesaid apertures, loading through said two open flat rigid lids of aforesaid box at a specified goegraphical location with a granular product load, transporting aforesaid box to another geographical location. and, unloading aforesaid box.

* * * * *